United States Patent [19]

O'Connor et al.

[11] Patent Number: 5,441,652

[45] Date of Patent: * Aug. 15, 1995

[54] PROCESS FOR THE PRODUCTION OF A LUBRICATING OIL ADDITIVE CONCENTRATE

[75] Inventors: Sean P. O'Connor; Charles Cane, both of Hull, England

[73] Assignee: BP Chemicals (Additives) Limited, London, England

[*] Notice: The portion of the term of this patent subsequent to Nov. 10, 2009 has been disclaimed.

[21] Appl. No.: 158,143

[22] Filed: Nov. 24, 1993

Related U.S. Application Data

[63] Continuation of Ser. No. 686,873, Apr. 16, 1991, abandoned, which is a continuation of Ser. No. 363,547, Jun. 8, 1989, abandoned.

[30] Foreign Application Priority Data

Jun. 14, 1988 [GB] United Kingdom ............... 8814813

[51] Int. Cl.$^6$ .......................................... C10M 159/22
[52] U.S. Cl. ....................................... 252/18; 252/25; 252/42.7
[58] Field of Search ............................ 252/18, 25, 427

[56] References Cited

U.S. PATENT DOCUMENTS

| | | |
|---|---|---|
| 3,256,186 | 6/1966 | Greenwald ............... 252/33 |
| 3,372,116 | 3/1968 | Meinhardt ............... 252/39 |
| 3,410,798 | 11/1968 | Cohen ............... 252/40.7 |
| 3,493,516 | 2/1970 | Alphin et al. ............... 252/33 |
| 3,535,242 | 10/1970 | Hashimoto et al. ............... 252/33 |
| 3,539,511 | 11/1970 | Sabol et al. ............... 252/33 |
| 3,544,463 | 12/1970 | Koft, Jr. ............... 252/33 |
| 3,609,076 | 9/1971 | Sabol et al. ............... 252/33.3 |
| 3,658,703 | 4/1972 | Gragson et al. ............... 252/33 |
| 3,671,430 | 6/1972 | Corringer ............... 252/33 |
| 3,714,042 | 1/1973 | Graenough ............... 252/39 |
| 3,766,066 | 10/1973 | McMillen ............... 252/33 |
| 4,049,560 | 9/1977 | Dominey ............... 252/25 |
| 4,328,111 | 5/1982 | Watson et al. ............... 252/33.4 |
| 4,598,026 | 6/1986 | Vinci ............... 252/33 |
| 4,698,170 | 10/1987 | Le Coent ............... 252/33.2 |
| 4,744,921 | 5/1988 | Liston ............... 252/39 |
| 4,879,053 | 11/1989 | Matthews et al. ............... 252/33 |
| 5,069,804 | 12/1991 | Marsh et al. ............... 252/56 R |
| 5,114,601 | 5/1992 | Cook et al. ............... 252/42.7 |
| 5,162,085 | 11/1992 | Cane et al. ............... 252/18 |
| 5,244,588 | 9/1993 | Koshima et al. ............... 252/25 |
| 5,281,345 | 1/1994 | Crawford et al. ............... 252/18 |

FOREIGN PATENT DOCUMENTS

| | | |
|---|---|---|
| 0095322 | 11/1983 | European Pat. Off. ... C10M 159/22 |
| 0271262 | 6/1988 | European Pat. Off. . |
| 0273588 | 7/1988 | European Pat. Off. . |
| 8803944 | 6/1988 | WIPO . |

Primary Examiner—Jerry D. Johnson
Attorney, Agent, or Firm—Brooks Haidt Haffner & Delahunty

[57] ABSTRACT

A process for the production of a lubricating oil additive concentrate having a TBN greater than 300 which process comprises reacting component (A) a defined derivative of phenol component (B) an alkaline earth metal base added either in a single addition of in a plurality of additions at intermediate points during the reaction, component (C) at least one compound which is (i) water, (ii) a $C_1$ to $C_{10}$ monohydric alcohol, (iii) a $C_1$ to $C_{20}$ ketone, (iv) a $C_1$ to $C_{10}$ carboxylic acid ester or (v) a $C_1$ to $C_{20}$ ether, component (D) a lubricating oil, component (E) carbon dioxide added subsequent to the, or each, addition of component (B), component (F) a defined carboxylic acid or derivative component (G) at least one compound which is (i) an inorganic halide or (ii) an ammonium alkanoate or a mono-, di-, tri-, or tetra-alkyl ammonium formate or alkanoate provided that, when component (G) is (ii), component (F) is not an acid chloride, the weight ratios of all components being such as to produce a concentrate having a TBN greater than 300.

18 Claims, No Drawings

PROCESS FOR THE PRODUCTION OF A LUBRICATING OIL ADDITIVE CONCENTRATE

This application is a continuation of application Ser. No. 07/686,873, filed Apr. 16, 1991, now abandoned, which is a continuation of Ser. No. 07/363,547, filed Jun. 8, 1989, now abandoned.

The present invention relates to the production of, and compositions comprising, a lubricating oil additive concentrate comprising alkaline earth metal hydrocarbyl phenates and their sulphurised derivatives.

In the internal combustion engine, by-products from the combustion chamber often blow by the piston and admix with the lubricating oil. Many of these by-products form acidic materials within the lubricating oil.

One class of compounds generally employed to neutralise the acidic materials and disperse sludge within the lubricating oil are the metal hydrocarbyl-substituted phenates and sulphurised metal hydrocarbyl-substituted phenates, wherein the metal is an alkaline earth metal such as calcium, magnesium or barium. Both "normal" and "overbased" alkaline earth metal hydrocarbyl-substituted phenates have been employed. The term "overbased" is used to describe those alkaline earth metal hydrocarbyl-substituted phenates in which the ratio of the number of equivalents of the alkaline earth metal moiety to the number of equivalents of the phenate moiety is greater than one, and is usually greater than 1.2 and may be as high as 4.5 or greater. In contrast, the equivalent ratio of alkaline earth metal moiety to phenate moiety in "normal" alkaline earth metal hydrocarbyl-substituted phenates is one. Thus, the "overbased" material usually contains greater than 20% in excess of the alkaline earth metal present in the corresponding "normal" material. For this reason "overbased" alkaline earth metal hydrocarbyl-substituted phenates have a greater capability for neutralising acidic matter than do the corresponding "normal" alkaline earth metal hydrocarbyl-substituted phenates.

The prior art teaches many methods for preparing both "normal" and "overbased" metal hydrocarbyl-substituted phenates.

In our copending European application No. 87310460.8 there is described a method by which oil-soluble products having a TBN in excess of 300, and in some cases greater than 350, whilst retaining an acceptable viscosity, that is a viscosity at 100° C. of less than 1000cSt, have been obtained by reacting at elevated temperature (A) either (i) a hydrocarbyl-substituted phenol or (ii) a hydrocarbyl-substituted phenol and sulphur, (B) an alkaline earth metal base added in either a single addition or in a plurality of additions at intermediate points during the reaction, (C) either a polyhydric alcohol, an alkylene glycol alkyl ether or a polyalkylene glycol ether, (D) a lubricating oil, (E) carbon dioxide added subsequent to the, or each, addition of component (B), and (F) sufficient to provide from greater than 2 to less than 40% by weight based on the weight of the concentrate of either (i) a carboxylic acid having the formula (I)

wherein $R^1$ is a $C_{10}$ to $C_{24}$ alkyl or alkenyl group and $R^2$ is hydrogen, a $C_1$ to $C_4$ alkyl group or a $CH_2COOH$ group, or an acid anhydride, acid chloride or ester thereof or (ii) a di- or polycarboxylic acid containing from 36 to 100 carbon atoms or an acid anhydride, acid chloride or ester thereof, the weight ratio of components (A) to (F) being such as to produce a concentrate having a TBN greater than 300.

As an essential component of the reaction mixture there is used component (C) either a polyhydric alcohol having from 2 to 4 carbon atoms, a di- or tri- ($C_2$ to $C_4$) glycol, an alkylene glycol alkyl ether or a polyalkylene glycol ether. An example of a suitable component (C) is ethylene glycol. Ethylene glycol is not only expensive, but its incomplete removal from the concentrate is reported to have undesirable properties in finished lubricating oils derived from the concentrate.

We have now found that high TBN lubricating oil additive concentrates comprising alkaline earth metal hydrocarbyl-substituted phenates and their sulphurised derivatives can be produced in the complete absence of ethylene glycol, and indeed any of the other compounds comprising component (C) of the process of the aforesaid European patent application No. 87310460.8-2104.

Accordingly, the present invention provides a process for the production of a lubricating oil additive concentrate having a TBN greater than 300 which process comprises reacting component (A) at least one compound which is (i) an alkaline earth metal hydrocarbyl-substituted phenate, (ii) a hydrocarbyl-substituted phenol, (iii) an alkaline earth metal hydrocarbyl-substituted phenate and a source of sulphur, (iv) a hydrocarbyl-substituted phenol and a source of sulphur, (v) an alkaline earth metal sulphurised hydrocarbyl-substituted phenate or (vi) a sulphurised hydrocarbyl-substituted phenol, component (B) an alkaline earth metal base added either in a single addition or in a plurality of additions at intermediate points during the reaction, component (C) at least one compound which is (i) water, (ii) a $C_1$ to $C_{10}$ monohydric alcohol, (iii) a $C_1$ to $C_{20}$ ketone, (iv) a $C_1$ to $C_{10}$ carboxylic acid ester or (v) a $C_1$ to $C_{20}$ ether, component (D) a lubricating oil, component (E) carbon dioxide added subsequent to the, or each, addition of component (B), component (F) sufficient to provide 2 to 40% by weight, based on the weight of the concentrate, of at least one compound which is (i) a carboxylic acid or an acid anhydride, acid chloride or ester thereof, said acid having the formula (I)

wherein $R^1$ is a $C_{10}$ to $C_{24}$ alkyl or alkenyl group and $R^2$ is hydrogen, a $C_1$ to $C_4$ alkyl group or a $CH_2COOH$ group, or (ii) a di-, or polycarboxylic acid containing from 36 to 100 carbon atoms or an acid anhydride, acid chloride or ester thereof, and component (G) at least one compound which is (i) an inorganic halide or (ii) an ammonium alkanoate or a mono-, di-, tri-, or tetra-alkyl ammonium formate or alkanoate provided that when component (G) is (ii), component (F) is not an acid chloride, the weight ratios of all components being such as to produce a concentrate having a TBN greater than 300.

Component (A) of the reaction mixture is (i) an alkaline earth metal hydrocarbyl-substituted phenate (ii) a hydrocarbyl-substituted phenol (iii) an alkaline earth metal hydrocarbyl-substituted phenate and a source of sulphur (iv) a hydrocarbyl-substituted phenol and a source of sulphur, (v) an alkaline earth metal sulphurised hydrocarbyl-substituted phenate or (vi) a sulphurised hydrocarbyl-substituted phenol, or mixtures of at least two of A(i)–A(vi). The source of sulphur can be for example elemental sulphur, a sulphur monohalide or a sulphur dihalide.

Using component (A)(i) or A(ii) the final product comprises an alkaline earth metal hydrocarbyl-substituted phenate; using component A(iii), A(iv), A(v) or A(vi) the final product comprises a sulphurised alkaline earth metal hydrocarbyl-substituted phenate. Suitably the alkaline earth metal may be strontium, calcium, magnesium or barium, preferably calcium, barium or magnesium, more preferably calcium.

The hydrocarbyl-substituted phenate moiety of the alkaline earth metal hydrocarbyl-substituted phenate is preferably derived from at least one hydrocarbyl-substituted phenol. The hydrocarbyl substituent groups of the hydrocarbyl-substituted phenol may be branched or unbranched. Suitable hydrocarbyl substituents contain from 4 to 50, preferably from 9 to 28 carbons atoms. A particularly suitable hydrocarbyl-substituted phenol is the $C_{12}$-alkyl phenol obtained by alkylating phenol with propylene tetramer.

The alkaline earth metal base (component B) may suitably be an alkaline earth metal oxide or hydroxide, preferably the hydroxide. Calcium hydroxide may be added for example in the form of quick lime (CaO) or slaked lime (Ca(OH)$_2$). Preferred alkaline earth metals are calcium, magnesium, strontium and barium, more preferably calcium. The alkaline earth metal base must be added in an amount relative to component (A) sufficient to produce a product having a TBN in excess of 300, preferably in excess of 350. This amount will depend on a number of factors including whether or not component (A) contains any alkaline earth metal base, the nature of the hydrocarbyl-substituent and will be higher than the amounts generally employed in prior art processes. Typically, the weight ratio of component (B) to component (A) may suitably be in the range from 0.2 to 50, preferably from 0.4 to 10. The alkaline earth metal base (B) may be added in whole to the initial reactants, or in part to the initial reactants and the remainder in one or more portions at a subsequent stage or stages in the process.

As component (C), a wide range of organic promoters may be employed, including $C_1$–$C_{10}$ monohydric alcohols, $C_1$–$C_{20}$ ketones, $C_1$–$C_{10}$ carboxylic acid esters or $C_1$–$C_{20}$ ethers which may be aliphatic, alicyclic or aromatic. Examples of suitable compounds as components (C) include methanol, acetone, ethyl acetate, cyclohexanol, benzyl alcohol, 2 ethyl hexanol and acetophenone. Component (C) may also be water. Component (C) can comprise a mixture of at least two of the above compounds.

In the preferred method of producing the concentrate of the present invention, there may be used in combination (i) component (C) as defined above and (ii) a solvent.

As the solvent (ii) there may suitably be used an inert hydrocarbon, which may be aliphatic or aromatic. Examples of suitable solvents (ii) include toluene, xylene, naphtha and aliphatic paraffins, for example hexane, and cycloaliphatic paraffins.

A particularly preferred combination of (i) and (ii) is methanol and toluene.

It is an advantage of operating the process of the present invention in the presence of component (C) as defined herein optionally in the presence of a solvent as defined herein, that component (F) can be solubilised at the reaction temperature. This avoids the necessity of increasing the reaction temperature to above the melting point of component (F) in order to facilitate the reaction. Consequently, the reaction can proceed efficiently at lower temperatures, preferably in the range 15° to 150° C., more preferably from 40° to 100° C., typically 60° C.

Component (D) is a lubricating oil. The lubricating oil is suitably an animal, vegetable or mineral oil. Suitably the lubricating oil is a petroleum-derived lubricating oil, such as a naphthenic base, paraffin base or mixed base oil. Solvent neutral oils are particularly suitable. Alternatively, the lubricating oil may be a synthetic lubricating oil. Suitably synthetic lubricating oils include synthetic ester lubricating oils, which oils include diesters such as di-octyl adipate, di-octyl sebacate and tri-decyladipate, or polymeric hydrocarbon lubricating oils, for example liquid polyisobutenes and poly-alpha olefins. The lubricating oil may suitably comprise from 10 to 90%, preferably from 10 to 70%, by weight of the concentrate. Component (D) the lubricating oil, can be added to the initial reactants or at a later stage in the process.

Component (E) is carbon dioxide, which may be added in the form of a gas or a solid, preferably in the form of a gas. In gaseous form it may suitably be blown through the reaction mixture. We have found that generally the amount of carbon dioxide incorporated increases with increasing concentrations of component (F).

Suitably carbon dioxide in a combined form may be present in the concentrate in an amount in the range from 5 to 20, preferably 9 to 15% by weight based on the weight of the concentrate.

Component (F) is either (i) a carboxylic acid of formula (I), or (ii) a di- or polycarboxylic acid containing from 36 to 100 carbon atoms, or an acid anhydride, an acid chloride or ester of (i) or (ii). As regards (i), this is a carboxylic acid having the formula (I) or an acid anhydride, acid chloride or ester thereof. Preferably $R^1$ is an unbranched alkyl or alkenyl group. Preferred acids of formula (I) are those wherein $R^2$ is hydrogen and $R^1$ is a $C_{10}$ to $C_{24}$, more preferably $C_{18}$ to $C_{24}$ unbranched alkyl group. Examples of suitable saturated carboxylic acids of formula (I) include capric, lauric, myristic, palmitic, stearic, isostearic, arachidic, behenic and lignoceric acids. Examples of suitable unsaturated acids of formula (I) include lauroleic, myristoleic, palmitoleic, oleic, gadoleic, erucic, ricinoleic, linoleic and linolenic acids. Mixtures of acids may also be employed, for example rape top fatty acids. Particularly suitable mixtures of acids are those commercial grades containing a range of acids, including both saturated and unsaturated acids. Such mixtures may be obtained synthetically or may be derived from natural products, for example tall, cotton, ground nut, coconut, linseed, palm kernel, olive, corn, palm, castor, soyabean, sunflower, herring and sardine oils and tallow. Sulphurised acids and acid mixtures may also be employed. Instead of, or in addition to, the carboxylic acid there may be used the acid anhydride, the acid chloride or the ester derivatives of the acid, preferably the acid anhydride. It is preferred however to use a carboxylic acid or a mixture of carboxylic acids. A preferred carboxylic acid of formula (II) is stearic acid.

Instead of, or in addition to (i), component (F) may be (ii) a di- or polycarboxylic acid containing from 36 to 100 carbon atoms or an acid anhydride, acid chloride or ester derivative thereof, preferably an acid anhydride thereof; (ii) is preferably a polyisobutene succinic acid or a polyisobutene succinic anhydride.

Suitably the concentrate may have a viscosity measured at 100° C. of less than 1000cSt, preferably less than 750 cSt, more preferably less than 500 cSt.

The amount of component (F) required to provide from 2 to 40% by weight based on the weight of the concentrate will be to a first approximation the amount desired in the concentrate. In calculating this amount allowance should be made for loss of water from carboxylic acids, for example.

Typically, the amount of component (F) incorporated is 10% to 35%, more preferably 12 to 20%, for example about 16% by weight based on the weight of the concentrate.

The reaction is carried out in the presence of component (G). As component (G) there may be used (i) an inorganic halide which may suitably be either a hydrogen, an ammonium or a metal halide. Suitably the metal moiety of the metal halide may be zinc, aluminum or an alkaline earth metal, preferably calcium. Of the halides, the chloride is preferred. Suitable compounds include hydrogen chloride, calcium chloride, ammonium chloride, aluminum chloride and zinc chloride, preferably calcium chloride.

Alternatively, component (G) may be (ii) an ammonium alkanoate or a mono-, di-, tri- or tetra-alkyl ammonium formate or alkanoate, preferably an ammonium alkanoate, more preferably ammonium acetate.

Suitably the amount of total alkaline earth metal present in the concentrate is 10 to 20% by weight based on the weight of the concentrate.

The alkaline earth metal hydrocarbyl-substituted phenate in the final product may be either sulphurised or non-sulphurised, preferably non-sulphurised. Where it is sulphurised, sulphur may be present in the concentrate in an amount of 1 to 6%, preferably 1.5 to 3% by weight based on the weight of the concentrate.

Preferably the TBN of the concentrate is greater than 350, more preferably greater than 400.

Suitably the reaction of components (A)–(G) may be carried out from 15° to 200° C., though the actual temperatures chosen for various stages of the reaction may differ if desired. The pressure may be atmospheric, subatmospheric or superatmospheric.

The concentrate may be recovered by conventional means, for example by distillative stripping of component (C), or the solvent (if any).

Finally, it is preferred to filter the concentrate so-obtained. Generally, the process of the invention will produce a concentrate having an acceptable viscosity, that is a viscosity of less than 1000 cSt at 100° C., and can produce concentrates having a viscosity less than 750 or 500 cSt at 100° C. Such viscometric properties are advantageous because they facilitate processing (including filtration) of the concentrate. However it is also possible to produce concentrates having a higher viscosity than 1000 cSt at 100° C., generally at higher TBN levels. Filtration of such concentrates presents a problem, which may be overcome by adding a diluent prior to filtration and stripping the diluent off after filtration. Alternatively, high viscosity concentrates, for example concentrates having a viscosity at 100° C. greater than 1000 cSt, and also having a high TBN, for example greater than 350, may be diluted by addition of further lubricating oil whilst maintaining a TBN greater than 300, thereby facilitating filtration.

Alternatively, the concentrate can be centrifuged in the presence of a diluent.

A final aspect of the present invention provides a finished lubricating oil composition which composition comprises a lubricating oil and a lubricating oil additive concentrate prepared as hereinbefore described.

Preferably the finished lubricating oil composition contains sufficient of the additive concentrate to provide a TBN of from 0.5 to 120.

The amount of additive concentrate present in the finished lubricating oil will depend on the nature of the final use. Thus, for marine lubricating oils the amount of additive concentrate present may suitably be sufficient to provide a TBN of 9 to 100 and for automobile engine lubricating oils the amount may suitably be sufficient to provide a TBN of 4 to 20.

The finished lubricating oil composition may also contain effective amounts of one or more other types of conventional lubricating oil additives, for example viscosity index improvers, anti-wear agents, antioxidants, dispersants, rust inhibitors, pour-point depressants, or the like, which may be incorporated into the finished lubricating oil composition either directly or through the intermediacy of the concentrate composition.

In addition to their use as additives for incorporation into lubricating oil compositions, the additive concentrate of the present invention may also find application as fuel additives.

The invention will now be further illustrated by reference to the following Examples. In all Examples the term "TBN" (Total Base Number) is used. TBN is expressed in mE KOH/g as measured by the method of ASTM D2896. In the examples where lime is used, it is in the form of slaked lime $Ca(OH)_2$. Viscosities were measured by the method of ASTM D445.

Example 1

| Charge | |
|---|---|
| ADX402 (an overbased sulphurised phenate, TBN 260, commercially available from Adibis). = | 238 g |
| Stearic acid (70% pure) = | 65.2 g |
| Lubricating oil (SN 100) = | 26.9 g |
| Calcium chloride = | 3.1 g |
| Toluene = | 207 g |
| Methanol = | 20.7 g |
| 2-Ethylhexanol = | 41.3 g |

Method
(a) The mixture was heated to 60° C. and reacted at this temperature,
(b) Lime (68.3g) was added at 60° C./700 mm
(c) Carbon dioxide (36g) was added at 60° C.
(d) The mixture was stripped at 200° C./10 mm Hg/over 60 minutes, and
(e) The product was filtered.

| Product Weights | |
|---|---|
| Crude Product = | 397.8 g |
| Distillate = | 251.2 g |
| Product Composition After Filtration | |
| Calcium = | 13.58% w/w |

-continued

| | | |
|---|---|---|
| Sulphur = | 2.02% | w/w |
| Carbon Dioxide = | 12.5% | w/w |
| TBN = | 380 | mg KOH/g |
| $V_{100}$ = | 575 | cSt |
| $V_{40}$ = | 6000 | cSt |
| VI = | 287 | |
| Stearic Acid = | 16.4% | w/w |

Example 2

| Charge | | |
|---|---|---|
| ADX 402 (an overbased sulphurised phenate, TBN 260, commercially available from Adibis). | 230.0 | g |
| Stearic acid (70% pure) = | 63.0 | g |
| Lubricating oil (SN 100) = | 26.0 | g |
| Calcium chloride = | 3.0 | g |
| Toluene = | 240 | g |
| Methanol = | 20.0 | g |

Method
(a) The mixture was heated to 60° C. and reacted at this temperature,
(b) Lime (66.0g) was added at 60° C./700 mm HE,
(c) Carbon dioxide (35.0g) was added at 60° C.,
(d) The mixture was stripped at 130° C./10 mm Hg/over 60 minutes, and
(e) The product was filtered.

| Product Weights | | |
|---|---|---|
| Crude Product = | 389.7 | g |
| Distillate = | 193.4 | g |
| Product Composition After Filtration | | |
| Calcium = | 13.1% | w/w |
| Sulphur = | 1.87% | w/w |
| Carbon Dioxide = | 12.5% | w/w |
| TBN = | 361.2 | mg KOH/g |
| $V_{100}$ = | 848 | cSt |
| $V_{40}$ = | 21700 | cSt |
| VI = | 219 | |
| Stearic Acid = | 16.2% | w/w |

Comparative Example

| Charge | | |
|---|---|---|
| ADX 402 (an overbased sulphurised phenate, TBN 260, commercially available from Adibis). | 238 | g |
| Stearic acid (70% pure) = | 65.2 | g |
| Lubricating oil (SN 100) = | 26.9 | g |
| Toluene = | 207 | g |
| Methanol = | 20.7 | g |
| 2-Ethylhexanol = | 41.3 | g |

Method
(a) The mixture was heated to 60° C. and reacted at this temperature,
(b) Lime (68.3g) was added at 60° C./700 mm Hg,
(c) Carbon dioxide (36g) was added at 60° C.,
(d) The mixture was stripped at 200° C./10 mm Hg/over 60 minutes, and
(e) The product was filtered but the filtration was aborted due to the viscosity of the product.

Example 3 illustrates that component (G) (calcium chloride in Examples 1 and 2) is an essential element of the invention.

We claim:

1. A process for the production of a lubricating oil additive concentrate having a TBN greater than 300 which process comprises reacting at a temperature in the range of from 40° to 100° C.;

component (A) at least one compound which is (i) an alkaline earth metal hydrocarbyl-substituted phenate, (ii) a hydrocarbyl-substituted phenol, (iii) an alkaline earth metal hydrocarbyl-substituted phenate and a source of sulphur, (iv) a hydrocarbyl-substituted phenol and a source of sulphur, (v) an alkaline earth metal sulphurized hydrocarbyl-substituted phenate or (vi) a sulphurized hydrocarbyl-substituted phenol, component (B) an alkaline earth metal base added either in a single addition or in a plurality of additions during the reaction, component (C) a combination of an inert hydrocarbon and at least one compound which is (i) water, (ii) a $C_1$ to $C_{10}$ monohydric alcohol, (iii) a $C_1$ to $C_{20}$ ketone, (iv) a $C_1$ to $C_{10}$ carboxylic acid ester or (v) a $C_1$ to $C_{20}$ ether, wherein neither (ii) nor (v) is an alkylene glycol alkyl ether or a polyalkylene glycol alkyl ether, component (D) a lubricating oil, component (E) carbon dioxide added subsequent to the, or each, addition of component (B), component (F) sufficient to provide 2 to 40% by weight based on the weight of the concentrate of at least one compound which is (i) a carboxylic acid or an acid anhydride, an acid chloride or ester thereof, said acid having the formula (I)

wherein $R^1$ is a $C_{10}$ to $C_{24}$ alkyl or alkenyl group and $R^2$ is hydrogen, a $C_1$ to $C_4$ alkyl group or a $CH_2COOH$ group, or (ii) a di- or poly-carboxylic acid containing from 36 to 100 carbon atoms or an acid anhydride, acid chloride or ester thereof, and component (G) at least one compound which is (i) an inorganic halide or (ii) an ammonium alkanoate or a mono-, di-, tri-, or tetra-alkyl ammonium formate or alkanoate provided that, when component (G) is (ii), component (F) is not an acid chloride, the weight ratios of all components being such as to produce a concentrate having a TBN greater than 300.

2. A process for the production of a lubricating oil additive concentrate having a TBN greater than 300 which process comprises reacting:

component (A) at least one compound which is (i) an alkaline earth metal hydrocarbyl-substituted phenate having a TBN of less than 300, (ii) a hydrocarbyl-substituted phenol, (iii) an alkaline earth metal hydrocarbyl-substituted phenate having a TBN of less than 300 and a source of sulphur, (iV) a hydrocarbyl-substituted phenol and a source of sulphur, (v) an alkaline earth metal sulphurized hydrocarbyl-substituted phenate having a TBN of less than 300 or (vi) a sulphurized hydrocarbyl-substituted phenol, component (B) an alkaline earth metal base added either in a single addition or in a plurality of additions during the reaction, component (C) a combination of an inert hydrocarbon and at least one compound which is (i) water, (ii) a $C_1$ to $C_{10}$ monohydric alcohol, (iii) a $C_1$ to $C_{20}$ ketone, (iv) a $C_1$ to $C_{10}$ carboxylic acid ester or (v) a $C_1$ to $C_{20}$ ether, wherein neither (ii) nor (v) is an alkylene glycol alkyl ether or a polyalkylene glycol alkyl ether, component (D) a lubricating oil, component (E) carbon dioxide added subsequent to the, or each, addition of component (B), component (F) sufficient to provide 2 to 40% by weight, based on the weight of the concentrate, of at least one compound which is (i) a carboxylic acid or an anhydride, an acid chloride or ester thereof, said acid having the formula (I)

$$R^1-\underset{\underset{R^2}{|}}{CH}-COOH \qquad (I)$$

wherein $R^1$ is a $C_{10}$ to $C_{24}$ alkyl or alkenyl group and $R^2$ is hydrogen, a $C_1$ to $C_4$ alkyl group or a $CH_2COOH$ group, or (ii) a di- or polycarboxylic acid containing from 36 to 100 carbon atoms or an acid anhydride, acid chloride or ester thereof, and component (G) at least one compound which is (i) an inorganic halide or (ii) an ammonium alkanoate or a mono-, di-, tri-, or tetra-alkyl ammonium formate or alkanoate provided that, when component (G) is (ii), component (F) is not an acid chloride, the weight ratios of all components being such as to produce a concentrate having a TBN greater than 300.

3. A process as claimed in either of claims 1 and 2 wherein component (G) is an inorganic metal halide.

4. A process as claimed in claim 3 wherein said inorganic halide is calcium chloride.

5. A process as claimed in either of claims 1 and 2 wherein component (G) is an ammonium alkanoate or a mono-, di-, tri- or tetra-alkyl ammonium formate or alkanoate.

6. A process as claimed in claim 5 wherein said ammonium alkanoate is ammonium acetate.

7. A process as claimed in claim 1 wherein said lubricating oil additive concentrate has a viscosity at 100° C. of less than 1000 cSt.

8. A process as claimed in claim 1 wherein component (A) is a calcium hydrocarbyl-substituted phenate
component (B) is calcium hydroxide
said other compound of component (C) is methanol or 2 ethyl hexanol
component (F) is stearic acid
component (G) is calcium chloride or ammonium acetate.

9. A process for the production of a lubricating oil additive concentrate as defined in claim 1 wherein component (A) is an alkaline earth metal hydrocarbyl-substituted phenate, said other compound of component (C) is a $C_1$-$C_{10}$ monohydric alcohol, $R^1$ in Formula (I) is a $C_{10}$ to $C_{24}$ alkyl or alkenyl group and $R^2$ in Formula (I) is hydrogen, a $C_1$ to $C_4$ alkyl group or a $CH_2COOH$ group, and component (G) is an inorganic halide.

10. A process as defined in claim 1 herein the ratio of component (A) to component (B) is in the range of from 0.2 to 50.

11. A process for the production of a lubricating oil additive concentrate having a TBN greater than 300 which process comprises reacting:

component (A) at least one compound which is (i) an alkaline earth metal hydrocarbyl-substituted phenate, (ii) a hydrocarbyl-substituted phenol, (iii) an alkaline earth metal hydrocarbyl-substituted phenate and a source of sulphur, (iv) a hydrocarbyl-substituted phenol and a source of sulphur, (v) an alkaline earth metal sulphurized hydrocarbyl-substituted phenate or (vi) a sulphurized hydrocarbyl-substituted phenol, component (B) an alkaline earth metal base added either in a single addition or in a plurality of additions during the reaction, component (C) a combination of an inert hydrocarbon and at least one compound which is (i) water, (ii) a $C_1$ to $C_{10}$ monohydric alcohol, (iii) a $C_1$ to $C_{20}$ ketone, (iv) a $C_1$ to $C_{10}$ carboxylic acid ester or (v) a $C_1$ to $C_{20}$ ether, wherein neither (ii) nor (v) is an alkylene glycol alkyl ether or a polyalkylene glycol alkyl ether, component (D) a lubricating oil, component (E) carbon dioxide added subsequent to the, or each, addition of component (B), component (F) sufficient to provide 2 to 40% by weight based on the weight of the concentrate of at least one compound which is (i) a carboxylic acid or an acid anhydride, an acid chloride or ester thereof, said acid having the formula (I)

$$R^1-\underset{\underset{R^2}{|}}{CH}-COOH \qquad (I)$$

wherein $R^1$ is a $C_{10}$ to $C_{24}$ alkyl or alkenyl group and $R^2$ is hydrogen, a $C_1$ to $C_4$ alkyl group or a $CH_2COOH$ group, or (ii) a di- or poly-carboxylic acid containing from 36 to 100 carbon atoms or an acid anhydride, acid chloride or ester thereof, and component (G) at least one compound which is (i) an inorganic halide or (ii) an ammonium alkanoate or a mono-, di-, tri-, or tetra-alkyl ammonium formate or alkanoate provided that, when component (G) is (ii), component (F) is not an acid chloride, the weight ratios of all components being such as to produce a concentrate having a TBN greater than 300.

12. The process as claimed in claim 11 wherein component (G) is an inorganic metal halide.

13. The process as claimed in claim 11 wherein component (G) is an ammonium alkanoate or a mono-, di-, tri- or tetra-alkyl ammonium formate or alkanoate.

14. The process as claimed in claim 11 wherein said lubricating oil additive concentrate has a viscosity at 100° C. of less than 1000 cSt.

15. The process as claimed in claim 11 wherein:
component (A) is a calcium hydrocarbyl-substituted phenate;
component (B) is calcium hydroxide;
component (C) is methanol or 2 ethyl hexanol;
component (F) is stearic acid; and
component (G) is calcium chloride or ammonium acetate.

16. The process as claimed in claim 11 wherein:
component (A) is an alkaline earth metal hydrocarbyl-substituted phenate;
said other compound of component (C) is a $C_1$ to $C_{10}$ monohydric alcohol;
$R^1$ in Formula (I) is a $C_{10}$ to $C_{24}$ alkyl or alkenyl group and $R^2$ in Formula (I) is hydrogen, a $C_1$ to $C_4$ alkyl group or a $CH_2COOH$ group; and
component (G) is an inorganic halide.

17. The process as claimed in claim 11 wherein the ratio of component (A) to component (B) is in the range of from 0.2 to 50.

18. The process as claimed in claim 11 wherein said other compound of component (C) is methanol, and the inert hydrocarbon is toluene.

* * * * *

UNITED STATES PATENT AND TRADEMARK OFFICE
CERTIFICATE OF CORRECTION

PATENT NO. : 5,441,652
DATED : August 15, 1995
INVENTOR(S) : SEAN P. O'CONNOR and CHARLES CANE It is certified that error appears in the above-indentified patent and that said Letters Patent is hereby corrected as shown below:

Col. 3, l. 28, change "ma7" to --may--.

Col. 6, Example 1, l. 58, formula should read "60°C./700 mm H$\underline{g}$"

Col. 7, Example 2, l. 24, formula should read "60°C./700 mm H$\underline{g}$"

Col. 8, line 2, replace the semi-colon (;) with a colon (:)

Col. 8, line 57, change "(iV)" to --(iv)--

Signed and Sealed this

Twenty-sixth Day of December, 1995

Attest:

BRUCE LEHMAN

*Attesting Officer*    *Commissioner of Patents and Trademarks*